US012110123B2

(12) United States Patent
Tsutsumi et al.

(10) Patent No.: US 12,110,123 B2
(45) Date of Patent: Oct. 8, 2024

(54) HYBRID AIRCRAFT

(71) Applicant: HONDA MOTOR CO., LTD., Tokyo (JP)

(72) Inventors: Daiko Tsutsumi, Wako (JP); Akinori Kita, Wako (JP); Takeshi Matsumoto, Wako (JP); Yuya Ishihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 255 days.

(21) Appl. No.: 17/694,748

(22) Filed: Mar. 15, 2022

(65) Prior Publication Data

US 2022/0306307 A1 Sep. 29, 2022

(30) Foreign Application Priority Data

Mar. 25, 2021 (JP) ................. 2021-050897

(51) Int. Cl.
| | |
|---|---|
| *B64D 31/06* | (2024.01) |
| *B60L 50/61* | (2019.01) |
| *B60L 53/60* | (2019.01) |
| *B60L 58/12* | (2019.01) |
| *B60L 58/13* | (2019.01) |

(Continued)

(52) U.S. Cl.
CPC ............. *B64D 31/06* (2013.01); *B60L 50/61* (2019.02); *B60L 53/60* (2019.02); *B60L 58/12* (2019.02); *B60L 58/13* (2019.02); *B64C 29/0025* (2013.01); *B64D 27/24* (2013.01); *B60L 2200/10* (2013.01); *B64D 27/026* (2024.01)

(58) Field of Classification Search
CPC ...... B64D 31/06; B64D 27/24; B64D 27/026; B60L 50/61; B60L 53/60; B60L 58/12; B60L 58/13; B60L 2200/10; B64C 29/0025
See application file for complete search history.

(56) References Cited

U.S. PATENT DOCUMENTS

| | | | |
|---|---|---|---|
| 2016/0023773 | A1 | 1/2016 | Himmelmann et al. |
| 2016/0204615 | A1 | 7/2016 | Radun et al. |

(Continued)

FOREIGN PATENT DOCUMENTS

| | | |
|---|---|---|
| CN | 108622402 | 10/2018 |
| JP | 6353055 | 7/2018 |

(Continued)

OTHER PUBLICATIONS

Japanese Office Action for Japanese Patent Application No. 2021-050897 dated Jun. 4, 2024.

*Primary Examiner* — Hunter B Lonsberry
*Assistant Examiner* — Harrison Heflin
(74) *Attorney, Agent, or Firm* — Amin, Turocy & Watson, LLP (57) ABSTRACT

A hybrid aircraft that flies by using a plurality of rotors (takeoff and landing rotors and cruise rotors) includes a generator, a battery charged with power generated by the generator, a plurality of electric motors that rotate the respective rotors by the power generated by the generator and power supplied from the battery, and a controller that sets a target remaining capacity of the battery according to a flight state of the aircraft and controls charging and discharging of the battery so that the remaining capacity of the battery approaches the target remaining capacity.

11 Claims, 8 Drawing Sheets

(51) Int. Cl.
*B64C 29/00* (2006.01)
*B64D 27/02* (2006.01)
*B64D 27/24* (2024.01)

(56) References Cited

U.S. PATENT DOCUMENTS

| | | | |
|---|---|---|---|
| 2018/0134384 A1 | 5/2018 | Ichihara | |
| 2018/0194484 A1* | 7/2018 | Livieratos | B64D 27/04 |
| 2021/0387545 A1* | 12/2021 | Lee | B60L 58/40 |
| 2022/0243670 A1* | 8/2022 | Park | B60L 50/16 |

FOREIGN PATENT DOCUMENTS

| | | |
|---|---|---|
| JP | 2022-118694 | 8/2022 |
| WO | 2017/030034 | 2/2017 |

* cited by examiner

HYBRID AIRCRAFT

CROSS-REFERENCE TO RELATED APPLICATIONS

This application is based upon and claims the benefit of priority from Japanese Patent Application No. 2021-050897 filed on Mar. 25, 2021, the contents of which are incorporated herein by reference.

BACKGROUND OF THE INVENTION

Field of the Invention

The present invention relates to a hybrid aircraft that rotates a rotor by supplying power to an electric motor from a generator and a battery.

Description of the Related Art

US 2016/0023773 A1 discloses an aircraft referred to as an electric vertical take-off and landing aircraft (eVTOL aircraft). This aircraft is a so-called hybrid aircraft. In hybrid aircraft, it is possible to rotate a rotor by supplying power to an electric motor from each of a generator driven by a gas turbine engine and an energy storage system (such as a battery). A hybrid aircraft flies by mainly supplying generated power to the electric motor. A single flight of an aircraft includes takeoff, climb, cruise, approach, and landing. US 2016/0023773 A1 indicates that maximum power is required at each of takeoff, climb, approach, and landing. Hereinafter, takeoff, climb, approach, and landing may be collectively referred to as takeoff and landing.

SUMMARY OF THE INVENTION

When a disturbance such as a gust occurs during the flight of the hybrid aircraft, the attitude of the airframe may be lost. In such a case, the controller of the hybrid aircraft controls each rotor to restore the attitude of the airframe. At this time, the controller repeatedly varies the required value of power for a short time. The required value of power is referred to as a required power value. It is difficult to make generated power follow fluctuation of the required power value. Therefore, when the generated power exceeds the required power value, the excess power is absorbed by charging the battery. Further, when the generated power is insufficient with respect to the required power value, the insufficient power is compensated by discharging of the battery.

The required power value during takeoff and landing is large. When a disturbance occurs during takeoff and landing, the fluctuation range of the required power value increases. At this time, the excess or shortage of power also increases, and the charge/discharge amount of the battery increases. Typically, the controller controls a power generation amount such that the remaining capacity (state of charge (SOC)) of the battery approaches a target value (target SOC). In a case where the target SOC is set to be high, when the battery is charged with excess power, there is a risk of overcharging. Overcharge is not preferable because it causes deterioration of the battery. On the other hand, when the target SOC is set to be low, there is no problem even if the battery is charged with excess power. However, when the target SOC is set to be low, the remaining capacity of the battery may be insufficient due to continuous use of the battery.

An object of the present invention is to solve the aforementioned problem.

According to an aspect of the present invention, provided is a hybrid aircraft that flies using a plurality of rotors, the hybrid aircraft comprising: a generator; a battery charged with power generated by the generator; a plurality of electric motors configured to rotate the respective rotors by the power generated by the generator and power supplied from the battery; and a controller configured to set a target remaining capacity of the battery according to a flight state of the hybrid aircraft, and control charging and discharging of the battery in a manner that a remaining capacity of the battery approaches the target remaining capacity.

According to the present invention, overcharging and undercharging of a battery can be prevented.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

[1. Overall Configuration of Hybrid Aircraft 10]

An overall configuration of a hybrid aircraft 10 will be described with reference to FIG. 1. The hybrid aircraft 10 is also referred to herein simply as aircraft 10. The aircraft 10 is an electric vertical take-off and landing aircraft. Electric vertical take-off and landing aircraft are referred to as eVTOL aircraft. The eVTOL aircraft generates lift and thrust by using rotors with electric motors 68 (FIG. 2) as their drive sources. The generated power and the stored power are each supplied to the electric motors 68. In this specification, a vertically upward direction is referred to as an upward direction. A vertically downward direction is referred to as a downward direction. Further, a moving direction of the aircraft 10 when the aircraft 10 moves (flies) in the horizontal direction is referred to as a forward direction. A direction opposite to the forward direction is referred to as a rearward direction. Further, when viewed from the aircraft 10 traveling forward, the right direction is defined as a right direction, and the left direction is defined as a left direction. Furthermore, the plan view of the aircraft 10 refers to a state in which the aircraft 10 is viewed from above. The front view of the aircraft 10 refers to a state in which the aircraft 10 is viewed from the front.

The aircraft 10 includes a fuselage 12, a front wing 14, a rear wing 16, two booms 18, eight takeoff and landing rotors 20, and two cruise rotors 22. A central axis A of the fuselage 12 extends in the front-rear direction. The structure of the aircraft 10 is bilaterally symmetrical about a vertical plane including the central axis A. In plan view, the central axis A overlaps with the center of gravity G of the aircraft 10.

The fuselage 12 is long in the front-rear direction. The fuselage 12 has a fuselage front portion 12f and a fuselage rear portion 12r. The fuselage front portion 12f is located in front of the center of gravity G. The fuselage rear portion 12r is located behind the center of gravity G. The fuselage front portion 12f becomes narrower toward the front end. The fuselage rear portion 12r becomes narrower toward the rear end. The fuselage 12 has a main body. The fuselage 12 may include the main body, and a fairing that covers a part of the main body. The main body and the fairing are referred to herein as the fuselage 12. A front portion of the fuselage 12 is referred to as the fuselage front portion 12f. A rear portion of the fuselage 12 is referred to as the fuselage rear portion 12r.

The front wing 14 is connected to an upper portion of the fuselage front portion 12f. The front wing 14 generates lift when the aircraft 10 moves forward.

The rear wing 16 is connected to an upper portion of the fuselage rear portion 12r. The rear wing 16 generates lift when the aircraft 10 moves forward.

The area of the rear wing 16 is larger than the area of the front wing 14. Further, the width of the rear wing 16 is longer than the width of the front wing 14. With such a structure, the lift generated by the rear wing 16 when the aircraft 10 moves forward is greater than the lift generated by the front wing 14. That is, the rear wing 16 functions as a main wing of the aircraft 10. The rear wing 16 is a swept wing that reduces air resistance. On the other hand, the front wing 14 functions as a canard wing of the aircraft 10.

The lift generated by the rear wing 16 when the aircraft 10 moves forward and the lift generated by the front wing 14 when the aircraft 10 moves forward may be substantially the same. The ratio between the lift generated by the front wing 14 and the lift generated by the rear wing 16 is appropriately determined depending on the position of the center of gravity G, the attitude of the airframe during cruising, and the like. In addition, the size of the front wing 14 and the size of the rear wing 16 are determined in order to generate desired lift. In this specification, the size of the wing is a wing area, a length, or the like.

The two booms 18 include a right boom 18R and a left boom 18L. The right boom 18R is disposed on the right side of the fuselage 12. The left boom 18L is disposed on the left side of the fuselage 12. The two booms 18 form a pair. The two booms 18 are arranged bilaterally symmetrically about the vertical plane including the central axis A. The two booms 18 are connected to the front wing 14 and the rear wing 16. The two booms 18 are connected to the fuselage 12 via the front wing 14 and the rear wing 16. The respective two booms 18 function as support members that support four takeoff and landing rotors 20.

The right boom 18R is a bar member. The right boom 18R extends from the front toward the rear. The right boom 18R is connected to the right wing tip of the front wing 14. The right boom 18R is connected to the rear wing 16. The front end of the right boom 18R is located in front of the front wing 14. The rear end of the right boom 18R is located behind the rear wing 16.

The left boom 18L is a bar member. The left boom 18L extends from the front toward the rear. The left boom 18L is connected to the left wing tip of the front wing 14. The left boom 18L is connected to the rear wing 16. The front end of the left boom 18L is located in front of the front wing 14. The rear end of the left boom 18L is located behind the rear wing 16.

Each of the eight takeoff and landing rotors 20 includes a mast (not shown), a hub (not shown), and a plurality of blades 46. The mast is connected to an output shaft portion of the electric motor 68. The hub is connected to the mast. The plurality of blades 46 are connected to the hub. The mast is arranged in parallel with the vertical direction. The mast is rotatable about a rotation axis extending in the vertical direction. The plurality of blades 46 are located above the booms 18, the front wing 14, and the rear wing 16. The pitch angle of the blades 46 is variable. With such a structure, the takeoff and landing rotors 20 rotate about the rotation axis and generate lift. One rotor unit for generating lift has one takeoff and landing rotor 20, a rotation mechanism (the electric motor 68 or the like), and a drive circuit. Note that one rotor unit may include one or more batteries 78.

The eight takeoff and landing rotors 20 include four takeoff and landing rotors 20a to 20d on the right side, and four takeoff and landing rotors 20a to 20d on the left side. The right-side takeoff and landing rotors 20a to 20d are disposed on the right side of the fuselage 12. The left-side takeoff and landing rotors 20a to 20d are disposed on the left side of the fuselage 12. The right-side takeoff and landing rotors 20a to 20d are supported by the right boom 18R. The left-side takeoff and landing rotors 20a to 20d are supported by the left boom 18L. The right-side takeoff and landing rotor 20a and the left-side takeoff and landing rotor 20a form a pair. The position of the right-side takeoff and landing rotor 20a in the front-rear direction and the position of the left-side takeoff and landing rotor 20a in the front-rear direction are the same. The same applies to the left and right-side takeoff and landing rotors 20b to 20d.

Figure 1:
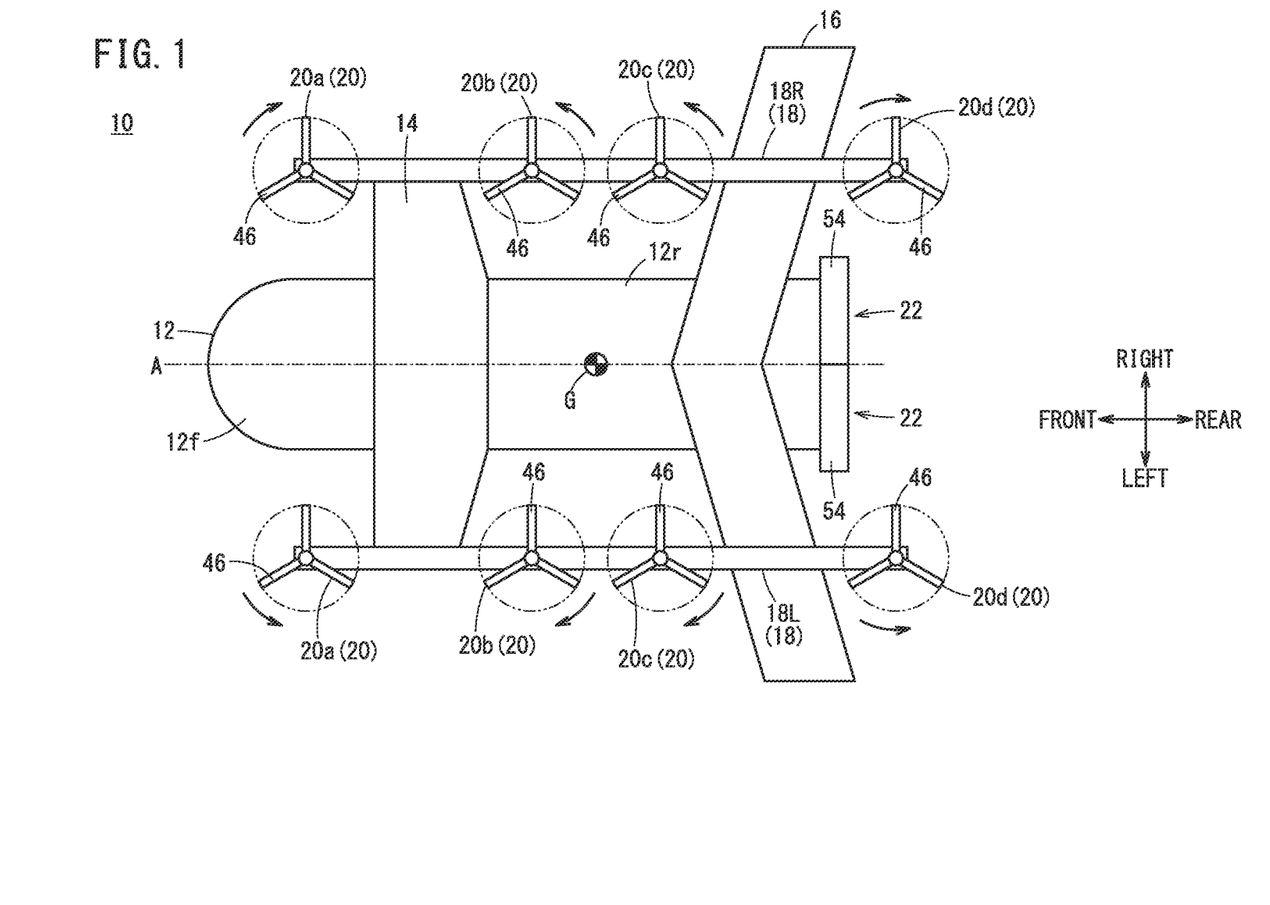
FIG. 1 is a schematic plan view of a hybrid aircraft.

As shown in FIG. 1, toward the rear, the pair of takeoff and landing rotors 20a, the front wing 14, the pair of takeoff and landing rotors 20b, the pair of takeoff and landing rotors 20c, the rear wing 16, and the pair of takeoff and landing rotors 20d are disposed in this order.

Each of the two cruise rotors 22 includes a mast (not shown), a hub (not shown), and a plurality of blades (not shown). The mast is connected to the output shaft portion of the electric motor 68. The hub is connected to the mast. The plurality of blades are connected to the hub. A cylindrical duct 54 is provided around the cruise rotor 22. The mast is disposed below the rear wing 16. The mast is disposed parallel to the front-rear direction. The mast is rotatable about a rotation axis extending in the front-rear direction. With such a structure, the cruise rotors 22 rotate about the rotation axis extending in the front-rear direction and generate thrust. One rotor unit for generating thrust includes one cruise rotor 22, a rotation mechanism (the electric motor 68 or the like), and a drive circuit. Note that one rotor unit may include one or more batteries 78.

Each of the two cruise rotors 22 is disposed on the fuselage rear portion 12r. The two cruise rotors 22 are located on the left side of the right-side takeoff and landing rotors 20a to 20d and on the right side of the left-side takeoff and landing rotors 20a to 20d. Further, the two cruise rotors 22 are positioned between the pair of takeoff and landing rotors 20c and the pair of takeoff and landing rotors 20d. The rotation axes of the two cruise rotors 22 are located below the blades 46 of the eight takeoff and landing rotors 20.

The positions of the two cruise rotors 22 in the front-rear direction coincide with each other. The positions of the two cruise rotors 22 in the vertical direction also coincide with each other. Further, the two cruise rotors 22 are arranged side by side in the left-right direction. The right-side cruise rotor 22 is disposed to the right of the vertical plane including the central axis A of the fuselage 12. The right-side cruise rotor 22 is supported by the right wing of the rear wing 16. The left-side cruise rotor 22 is disposed to the left of the vertical plane including the central axis A of the fuselage 12. The left-side cruise rotor 22 is supported by the left wing of the rear wing 16.

[2. Power System 60]

Figure 2:
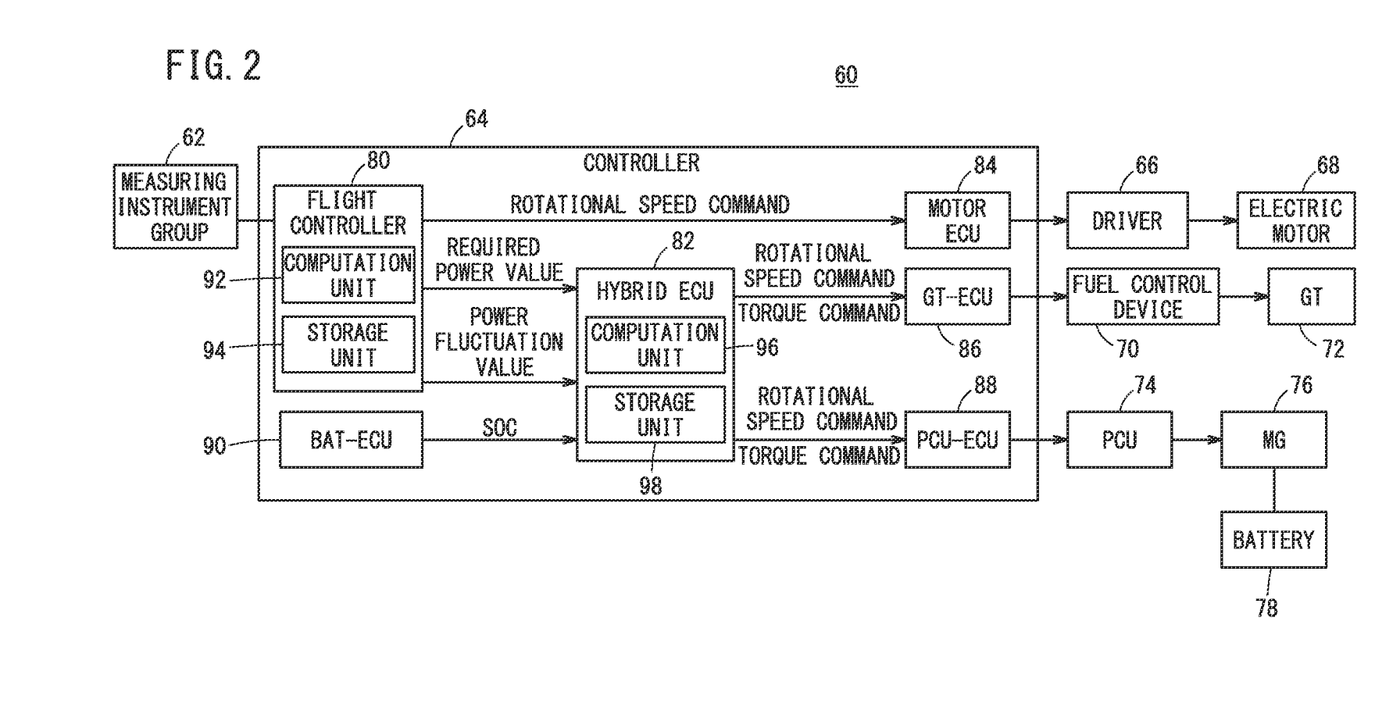
FIG. 2 is a block diagram showing a configuration of a power system included in the hybrid aircraft.

FIG. 2 is a block diagram showing a configuration of a power system 60 included in the hybrid aircraft 10. The power system 60 includes a measuring instrument group 62, a controller 64, a driver 66, the electric motor 68, a fuel control device 70, a gas turbine engine 72, a power control unit 74, a motor generator 76, and the battery 78. The gas turbine engine 72 is also referred to herein as a GT 72. The power control unit 74 is also referred to herein as a PCU 74. The motor generator 76 is also referred to herein as a MG 76. One driver 66 and one electric motor 68 are provided as a set. A set of the driver 66 and the electric motor 68 is provided for each of the rotors (the plurality of takeoff and landing rotors 20 and the plurality of cruise rotors 22). One fuel control device 70, one GT 72, one PCU 74, and one MG 76 are provided as a set. One or a plurality of sets of the GT 72 and the like are provided.

The measuring instrument group 62 includes various measuring instruments that detect the flight state of the aircraft 10. The measuring instrument group 62 includes a sensor that measures an operation amount of an operation tool operated by a pilot. For example, the sensor measures an operation amount of a control stick or the like. The measuring instrument group 62 includes a measuring instrument that measures the rotational speed of the electric motor 68. The measuring instrument group 62 may include a measuring instrument that measures the moving speed of the aircraft 10 in the horizontal direction. The measuring instrument group 62 may include a measuring instrument that measures the altitude of the aircraft 10. Further, the measuring instrument group 62 may include a measuring instrument that measures at least one of yaw, pitch, or roll of the airframe. Further, the measuring instrument group 62 may include a measuring instrument that measures the wind speed and the wind direction. Each measuring instrument of the measuring instrument group 62 periodically transmits a measurement value to a flight controller 80 of the controller 64.

The controller 64 includes one or more control units. In the present embodiment, the controller 64 includes the flight controller 80, a hybrid ECU 82, a motor ECU 84, a GT-ECU 86, a PCU-ECU 88, and a BAT-ECU 90. The controller 64 controls the operation of each rotor (the takeoff and landing rotor 20 and the cruise rotor 22). The controller 64 controls the SOC of the battery 78 in accordance with the flight state of the aircraft 10.

The flight controller 80 includes a computation unit 92, a storage unit 94, an input/output unit (not shown), and the like. The computation unit 92 includes a processor such as a CPU. The computation unit 92 performs various processes by executing programs stored in the storage unit 94. The computation unit 92 may include an integrated circuit such as an ASIC or an FPGA. Further, the computation unit 92 may include an electronic circuit including a discrete device. The storage unit 94 includes a volatile memory and a nonvolatile memory. Examples of the volatile memory include a RAM and the like. Examples of the nonvolatile memory include, for example, a ROM, a flash memory, and the like. The nonvolatile memory stores programs executed by the computation unit 92. The nonvolatile memory stores various types of information input in advance by a user.

The flight controller 80 acquires each measurement value from the measuring instrument group 62 and performs various calculations and various determinations using a predetermined algorithm or table. For example, the flight controller 80 determines the flight mode at that time point. The flight mode includes various modes from takeoff to landing. For example, the flight mode includes a vertical takeoff mode M1, a climb mode M2, a cruise mode (horizontal flight mode) M3, a descent mode M4, and a vertical landing mode M5. Further, the flight controller 80 calculates the rotational speed of each electric motor 68 necessary at that time point, in accordance with the flight mode and the operation of the operation tool. After the calculation, the flight controller 80 outputs a rotational speed command for each electric motor 68, to the motor ECU 84. Further, the flight controller 80 calculates power required by the aircraft 10. After the calculation, the flight controller 80 outputs the required power value [unit: w] to the hybrid ECU 82. In addition, the flight controller 80 determines a power fluctuation value [unit: w] in accordance with the flight mode. After the determination, the flight controller 80 outputs the power fluctuation value to the hybrid ECU 82.

Figure 3A:
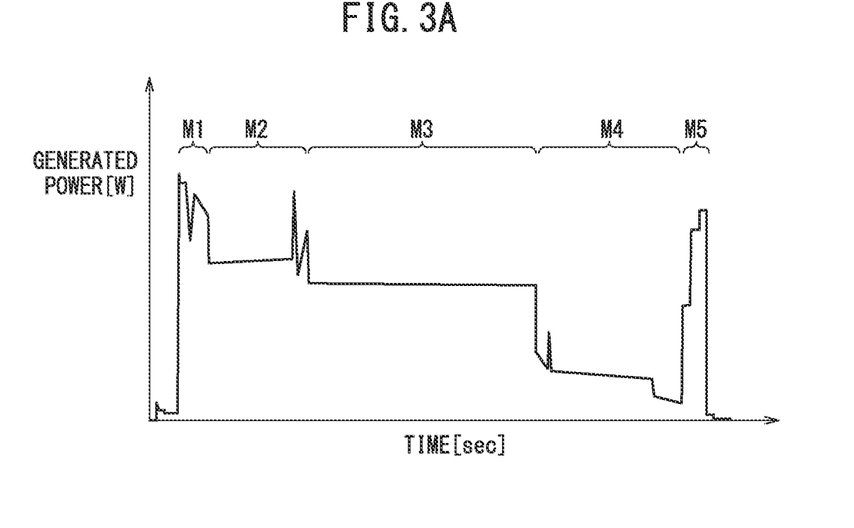
FIG. 3A is a diagram showing a lapse of time from takeoff to landing and a change in generated power.
Figure 3B:
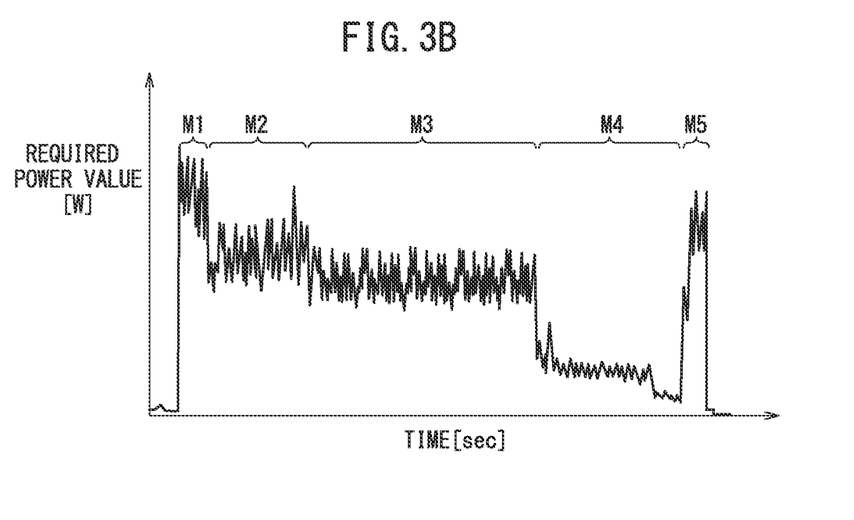
FIG. 3B is a diagram showing a lapse of time from takeoff to landing and a change in a required power value.
Figure 4:
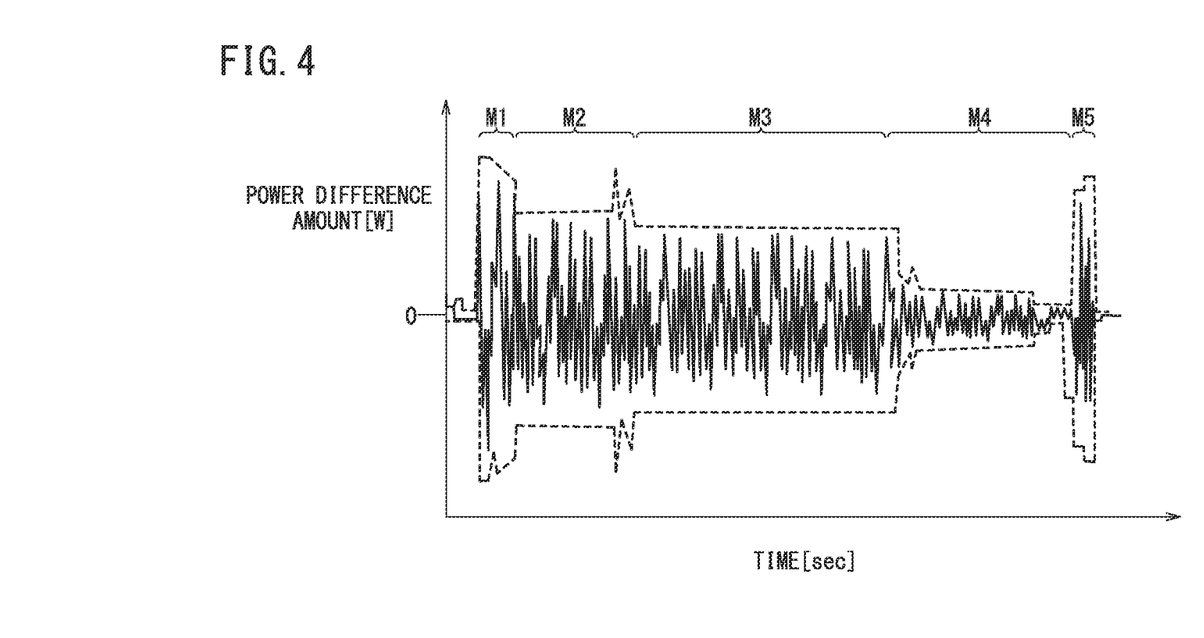
FIG. 4 is a diagram showing a change in an amount of difference between the generated power in FIG. 3A and the required power value in FIG. 3B.

Here, the flight mode and the required power value, and the flight mode and the power fluctuation value will be described. FIG. 3A is a diagram showing a lapse of time from takeoff to landing and a change in generated power. FIG. 3B is a diagram showing a lapse of time from takeoff to landing and a change in the required power value. FIG. 4 is a diagram showing a change in a difference amount (power difference amount) between the generated power in FIG. 3A and the required power value in FIG. 3B. In FIG. 4, a solid line indicates the power difference amount, and a broken line indicates positive and negative maximum values. The power difference amount shown in FIG. 4 periodically repeats up and down fluctuation with respect to the generated power (vertical axis 0). The maximum fluctuation amount of the power difference amount per unit time is referred to as a power fluctuation value. For example, the power fluctuation value corresponds to a fluctuation amount from a positive maximum value to a negative maximum value in the power difference amount for one cycle. The power fluctuation value is a substantially constant value for each flight mode.

As shown in FIG. 3B, the required power value becomes maximum when the flight mode is the vertical takeoff mode M1. The required power value gradually decreases as the flight mode transitions to the climb mode M2 and the cruise mode M3. The required power value becomes minimum in the descent mode M4. Furthermore, the required power value becomes again maximum when the flight mode is the vertical landing mode M5. The power fluctuation value is substantially proportional to the magnitude of the required power value. Therefore, as shown in FIG. 4, the power fluctuation value becomes also maximum in the vertical takeoff mode M1 and the vertical landing mode M5.

During the vertical takeoff mode M1 and the vertical landing mode M5, the takeoff and landing rotors 20 are used. In the climb mode M2, the takeoff and landing rotors 20 and the cruise rotors 22 are used together. In the climb mode M2, the usage rate of the takeoff and landing rotors 20 is gradually decreased, and the usage rate of the cruise rotors 22 is gradually increased. In the cruise mode M3, the cruise rotors 22 are used. In the descent mode M4, the takeoff and landing rotors 20 and the cruise rotors 22 are used together. In the descent mode M4, the usage rate of the takeoff and landing rotors 20 is gradually increased, and the usage rate of the cruise rotors 22 is gradually decreased. The required power value and the power fluctuation value become large in the vertical takeoff mode M1 and the vertical landing mode M5. The storage unit 94 stores in advance a relationship among the flight mode, the required power value, and the power fluctuation value. The computation unit 92 determines the flight mode, and calculates the required power value and the power fluctuation value.

Figure 6:
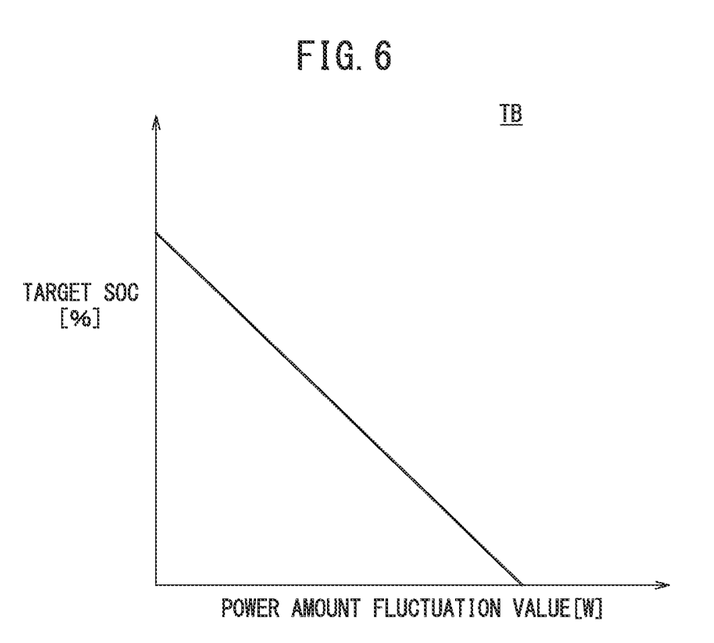
FIG. 6 is a diagram showing an SOC conversion table.

Returning to FIG. 2, the description of the power system 60 continues. The hybrid ECU 82 includes a computation unit 96, a storage unit 98, an input/output unit (not shown), and the like. The computation unit 96 is configured by, for example, a processor such as a CPU, similarly to the computation unit 92. The storage unit 98 is configured by, for example, a volatile memory and a nonvolatile memory, similarly to the storage unit 94. The nonvolatile memory stores an SOC conversion table TB (FIG. 6).

The hybrid ECU 82 acquires the required power value and the power fluctuation value from the flight controller 80. The hybrid ECU 82 acquires the SOC of the battery 78 from the BAT-ECU 90. The hybrid ECU 82 calculates a power generation amount required at that time point, based on the acquired information. After the calculation, the hybrid ECU 82 outputs, to the GT-ECU 86, a rotational speed command for each GT 72 and a torque command for each GT 72. After the calculation, the hybrid ECU 82 outputs, to the PCU-ECU 88, a rotational speed command for each MG 76 and a torque command for each MG 76. The calculation process of the hybrid ECU 82 will be described in [3] below.

The configuration of the motor ECU 84 is the same as that of the hybrid ECU 82. The motor ECU 84 acquires the rotational speed command from the flight controller 80 and outputs a control signal to each driver 66.

The configuration of the GT-ECU 86 is also the same as that of the hybrid ECU 82. The GT-ECU 86 acquires the rotational speed command and the torque command from the hybrid ECU 82, and outputs a control signal to each fuel control device 70.

The configuration of the PCU-ECU 88 is also the same as that of the hybrid ECU 82. The PCU-ECU 88 acquires the rotational speed command and the torque command from the hybrid ECU 82 and outputs a control signal to each PCU 74.

The configuration of the BAT-ECU 90 is also the same as that of the hybrid ECU 82. The BAT-ECU 90 acquires information such as the voltage, current, and temperature of the battery 78 from a plurality of sensors (not shown), and calculates the SOC using a predetermined algorithm or table. The BAT-ECU 90 outputs the SOC to the hybrid ECU 82.

The driver 66 is a drive circuit for the electric motor 68. For example, the driver 66 is a circuit including an inverter or the like. The driver 66 is interposed between the MG 76 and the electric motor 68. The driver 66 is also interposed between the battery 78 and the electric motor 68. The driver 66 supplies power to the electric motor 68 from at least one of the MG 76 or the battery 78, based on the control signals output by the motor ECU 84.

The fuel control device 70 is a device that controls fuel to be supplied to the GT 72. For example, the fuel control device 70 is a device including a fuel control valve. The fuel control device 70 supplies fuel to the GT 72 based on the control signals output by the GT-ECU 86.

The PCU 74 includes an output control circuit for the MG 76 and a drive circuit for the MG 76. For example, the PCU 74 includes a circuit including a DC-DC converter, an inverter, and the like. The PCU 74 is interposed between the MG 76 and the electric motor 68, and between the MG 76 and the battery 78. The PCU 74 operates to supply power to each of the electric motor 68 and the battery 78 from the MG 76, based on the control signals output by the PCU-ECU 88. Further, the PCU 74 operates to supply power to the MG 76 from the battery 78, based on the control signals output by the PCU-ECU 88.

The plurality of electric motors 68 are connected to the rotors (the takeoff and landing rotors 20 or the cruise rotors 22). The GT 72 and the MG 76 are connected to each other.

[3. Hybrid ECU 82]

Figure 5:
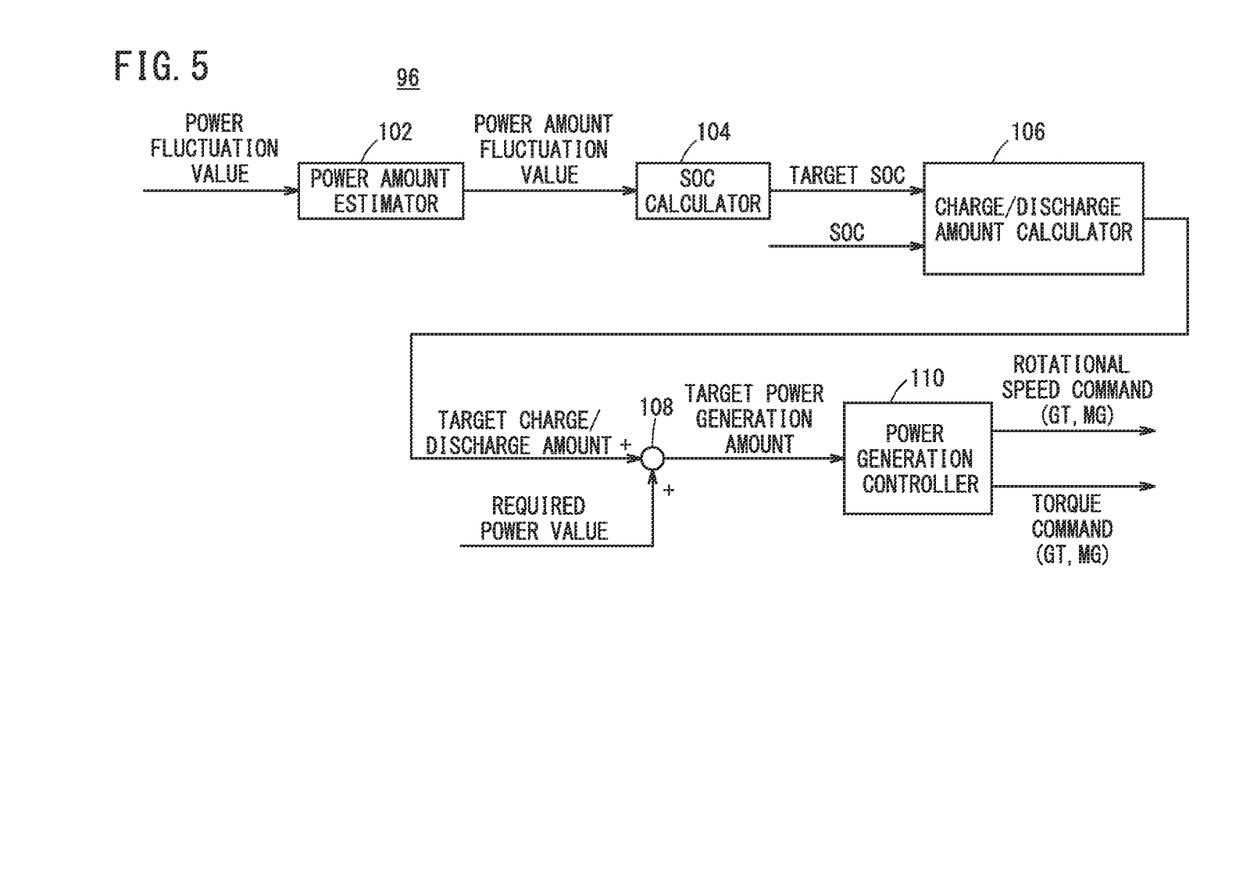
FIG. 5 is a block diagram showing processing steps of a hybrid ECU.

FIG. 5 is a block diagram showing the processing steps of the hybrid ECU 82. The computation unit 96 of the hybrid ECU 82 functions as a power amount estimator 102, an SOC calculator 104, a charge/discharge amount calculator 106, an adder 108, and a power generation controller 110.

The power amount estimator 102 estimates a power amount fluctuation value [unit: wh] based on the power fluctuation value acquired from the flight controller 80. The power amount estimator 102 calculates a power amount fluctuation value by multiplying the power fluctuation value by a time corresponding to one cycle of the power difference amount shown in FIG. 4.

The SOC calculator 104 calculates a target SOC based on the power amount fluctuation value acquired from the power amount estimator 102 and the SOC conversion table TB. As shown in FIG. 6, the SOC conversion table TB is set such that the target SOC decreases as the power amount fluctuation value increases.

The charge/discharge amount calculator 106 calculates a target charge/discharge amount [unit: w] based on the target SOC acquired from the SOC calculator 104 and the SOC acquired from the BAT-ECU 90. The charge/discharge amount calculator 106 performs PID control. That is, the charge/discharge amount calculator 106 calculates the target charge/discharge amount for bringing the SOC close to the target SOC.

The adder 108 adds the target charge/discharge amount acquired from the charge/discharge amount calculator 106 and the required power value acquired from the flight controller 80, to obtain a target power generation amount [unit: w].

The power generation controller 110 calculates the rotational speed and torque of the GT 72 necessary for obtaining the target power generation amount acquired from the adder 108. The power generation controller 110 also calculates the rotational speed and torque of the MG 76 necessary for obtaining the target power generation amount acquired from the adder 108. The power generation controller 110 outputs a rotational speed command for the GT 72 and a torque command for the GT 72 to the GT-ECU 86. The power generation controller 110 outputs a rotational speed command for the MG 76 and a torque command for the MG 76 to the PCU-ECU 88.

[4. SOC Control Example]

[4.1. First Control Example]

Figure 7A:
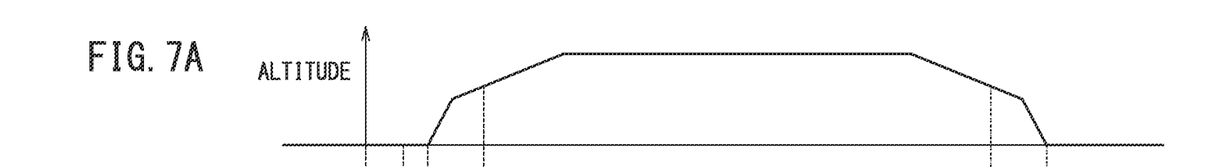
FIG. 7A is a diagram showing a lapse of time from before takeoff to after landing of the hybrid aircraft and a change in altitude.
Figure 7B:
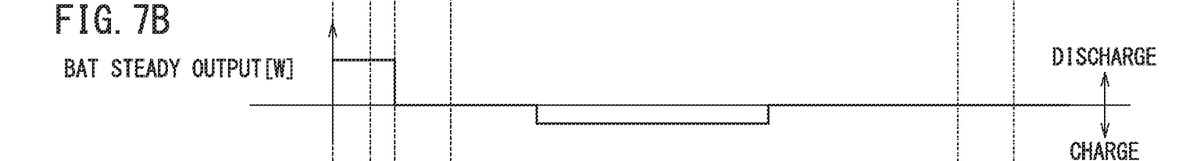
FIG. 7B is a diagram showing a lapse of time from before takeoff to after landing of the hybrid aircraft and a steady output of a battery.
Figure 7C:
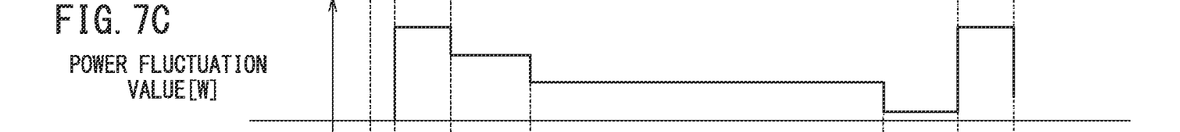
FIG. 7C is a diagram showing a lapse of time from before takeoff to after landing of the hybrid aircraft and a change in a power fluctuation value.
Figure 7D:
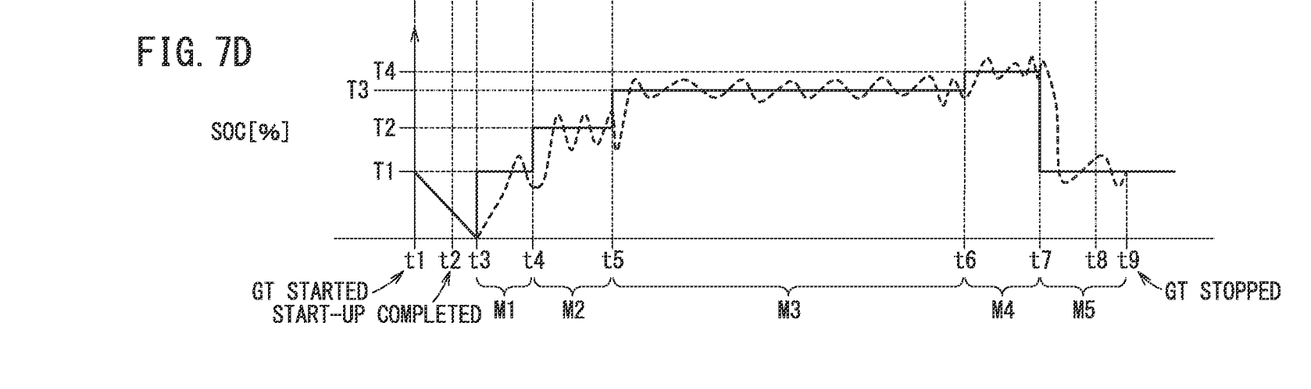
FIG. 7D is a diagram showing a lapse of time from before takeoff to after landing of the hybrid aircraft, a change in SOC, and a change in target SOC.
Figure 8A:
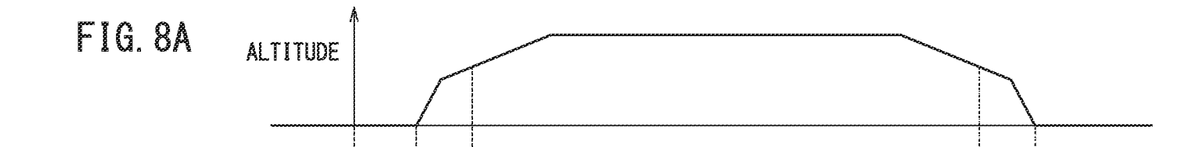
FIG. 8A is a diagram showing a lapse of time from before takeoff to after landing of the hybrid aircraft and a change in altitude.
Figure 8B:
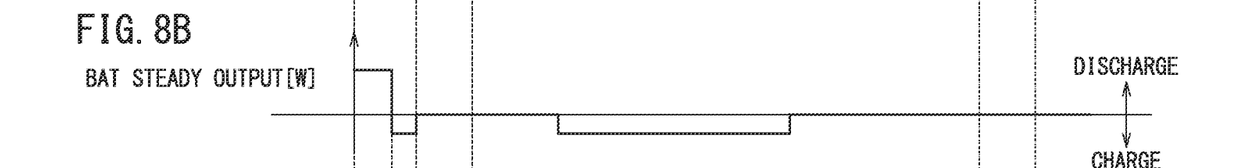
FIG. 8B is a diagram showing a lapse of time from before takeoff to after landing of the hybrid aircraft and the steady output of the battery.
Figure 8C:
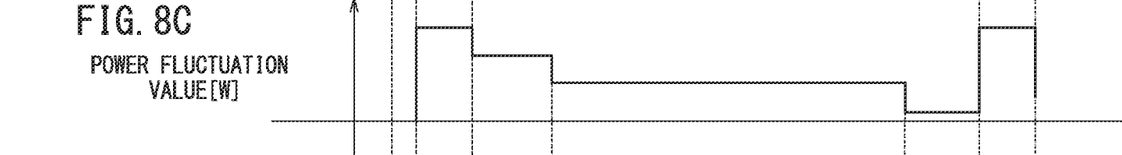
FIG. 8C is a diagram showing a lapse of time from before takeoff to after landing of the hybrid aircraft and a change in a power fluctuation value.
Figure 8D:
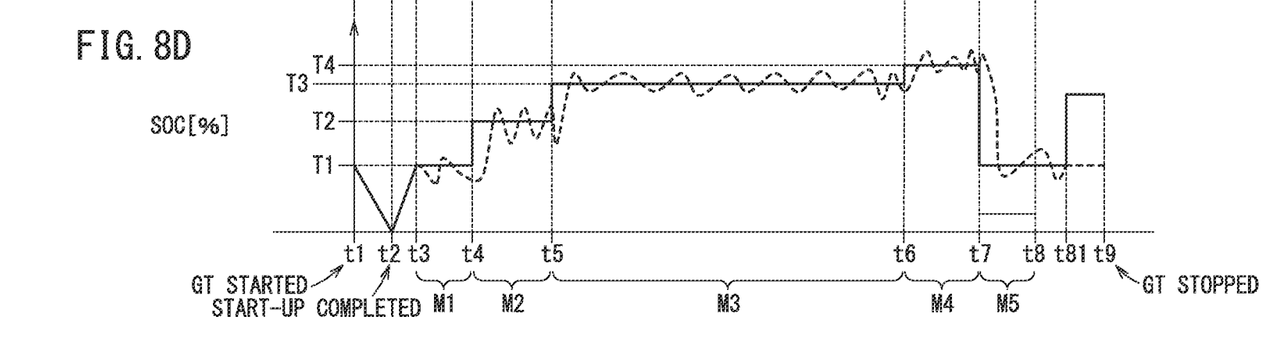
FIG. 8D is a diagram showing a lapse of time from before takeoff to after landing of the hybrid aircraft, a change in SOC, and a change in target SOC.

A first control example of the SOC from before takeoff of the aircraft 10 to after landing of the aircraft 10 will be described with reference to FIGS. 7A to 7D. In FIG. 7D, a solid line indicates a target SOC, and a broken line indicates an actual SOC. As shown in FIG. 7A, at time t1, the pilot performs an operation of starting the GT 72. At time t2, the start-up of the GT 72 is complete. At time t3, the aircraft takes off and climbs vertically. At time t4, the aircraft starts moving forward while climbing. At time t5, the aircraft starts horizontal flight, that is, cruise. At time t6, the aircraft starts to descend while moving forward. At time t7, the aircraft descends vertically. At time t8, the aircraft lands. At time t9, the pilot stops the GT 72.

The flight mode from the time t3 to the time t4 is the vertical takeoff mode M1. The flight mode from the time t4 to the time t5 is the climb mode M2. The flight mode from the time t5 to the time t6 is the cruise mode M3. The flight mode from the time t6 to the time t7 is the descent mode M4. The flight mode from the time t7 to the time t8 is the vertical landing mode M5.

From the time t1 to the time t3, the controller 64 controls the PCU 74 and the driver 66 to supply the power of the battery 78 to the MG 76 and the electric motor 68. During this time, the battery 78 is discharged as shown in FIG. 7B. Therefore, as shown in FIG. 7D, the SOC decreases. Note that no disturbance is applied to the airframe at the time point before the aircraft takes off. Therefore, the required power value does not fluctuate. Further, it is possible to estimate the amount of power required to start the GT 72, that is, the amount of decrease in the SOC. Therefore, the target SOC becomes equal to the SOC until the aircraft takes off. Therefore, the target SOC follows the SOC.

From the time t3 to the time t4, the flight mode is the vertical takeoff mode M1. During the vertical takeoff mode M1, the controller 64 controls the PCU 74 and the driver 66 to supply the generated power of the MG 76 to the electric motor 68. During this time, the battery 78 is not steadily charged and discharged as shown in FIG. 7B. However, the battery 78 is charged with an excess of the generated power of the MG 76 exceeding the required power value, and discharges power corresponding to a shortage of the generated power of the MG 76 with respect to the required power value. The power fluctuation value during the vertical takeoff mode M1 is large. For this reason, the excess or shortage of the generated power of the MG 76 with respect to the required power value is also large. As shown in FIG. 7D, the controller 64 (SOC calculator 104) sets, as the target SOC, a lowest value T1 among the target values set during flight.

Thus, the battery 78 can be charged with an excess of the generated power. Accordingly, overcharging of the battery 78 is suppressed.

From the time t4 to the time t5, the flight mode is the climb mode M2. During the climb mode M2, the controller 64 controls the PCU 74 and the driver 66 to supply the generated power of the MG 76 to the electric motor 68. During this time, the battery 78 is not steadily charged and discharged as shown in FIG. 7B. On the other hand, the battery 78 is charged with or discharges power corresponding to an excess or shortage of the generated power of the MG 76 with respect to the required power value. The power fluctuation value during the climb mode M2 is the second largest. Therefore, the excess or shortage of the generated power of the MG 76 with respect to the required power value is also the second largest. As shown in FIG. 7D, the controller 64 sets, as the target SOC, a second lowest value T2 among the target values set during flight. Thus, the battery 78 can be charged with an excess of the generated power. Accordingly, overcharging of the battery 78 is suppressed.

From the time point t5 to the time point t6, the flight mode is the cruise mode M3. During the cruise mode M3, the controller 64 controls the PCU 74 and the driver 66 to supply the generated power of the MG 76 to the electric motor 68. During this time, power consumption of the electric motor 68 is small. For this reason, as shown in FIG. 7B, the battery 78 is steadily charged. However, when the battery 78 is fully charged, the charging of the battery 78 is stopped. The power fluctuation value during the cruise mode M3 is small. Therefore, the excess or shortage of the generated power of the MG 76 with respect to the required power value is also small. As shown in FIG. 7D, the controller 64 sets, as the target SOC, a second highest value T3 among the target values set during flight. Thus, the SOC of the battery 78 can be increased. Therefore, the usable time of the battery 78 can be extended.

From the time t6 to the time t7, the flight mode is the descent mode M4. During the descent mode M4, the controller 64 controls the PCU 74 and the driver 66 to supply the generated power of the MG 76 to the electric motor 68. During this time, power consumption of the electric motor 68 is small. As shown in FIG. 7B, the battery 78 is not steadily charged and discharged. The power fluctuation value during the descent mode M4 is small. Therefore, the excess or shortage of the generated power of the MG 76 with respect to the required power value is also small. As shown in FIG. 7D, the controller 64 sets, as the target SOC, a highest value T4 among the target values set during flight. Thus, the SOC of the battery 78 can be increased.

From the time t7 to the time t8, the flight mode is the vertical landing mode M5. During the vertical landing mode M5, the controller 64 controls the PCU 74 and the driver 66 to supply the generated power of the MG 76 to the electric motor 68. During this time, the battery 78 is not steadily charged and discharged as shown in FIG. 7B. However, the battery 78 is charged with an excess of the generated power of the MG 76 exceeding the required power value, and discharges power corresponding to a shortage of the generated power of the MG 76 with respect to the required power value. The power fluctuation value during the vertical landing mode M5 is large. For this reason, the excess or shortage of the generated power of the MG 76 with respect to the required power value is also large. As shown in FIG. 7D, the controller 64 sets, as the target SOC, the lowest value T1 among the target values set during flight. Thus, the battery 78 can be charged with an excess of the generated power. Accordingly, overcharging of the battery 78 is suppressed.

[4.2. Second and Third Control Examples]

The second control example and the third control example will be described with reference to FIGS. 8A to 8D. The second control example is different from the first control example in control before takeoff. The third control example is different from the first control example in control after landing.

In the first control example, from the time t2 to the time t3, the controller 64 controls the PCU 74 and the driver 66 to consume the power of the battery 78. Therefore, the battery 78 is discharged and the SOC decreases.

In the second control example, during a period from the time t2 to the time t3, the controller 64 controls the PCU 74 and the driver 66 to supply the generated power of the MG 76 to the battery 78. The controller 64 sets, as the target SOC, a value greater than the decreased SOC before the flight mode transitions to the vertical takeoff mode M1. For example, the controller 64 sets, as the target SOC, the set value T1 used in the vertical takeoff mode M1. In this way, the SOC that has decreased due to the start-up of the GT 72 is recovered early. Therefore, after takeoff, the SOC can be quickly brought close to the target SOC.

In the third control example, at a time t81 between the time t8 and the time t9, the controller 64 controls the PCU 74 and the driver 66 to supply the generated power of the MG 76 to the battery 78. In this control, the controller 64 sets, as the target SOC, a value larger than the set value T1 used in the vertical takeoff mode M1. As a result, a decrease in the SOC of the battery 78 due to the start-up of the GT 72 can be compensated for in advance. Therefore, after takeoff, the SOC can be quickly brought close to the target SOC.

[4.3. Other Control Examples]

In the first to third control examples, the storage unit 94 of the flight controller 80 stores in advance the relationship among the flight mode, the required power value, and the power fluctuation value. The storage unit 94 may store in advance a relationship between the required power value and measured values of the wind speed, the wind direction, the altitude, the temperature, and the atmospheric pressure. The storage unit 94 may store in advance a relationship between the power fluctuation value and the measured values of the wind speed, the wind direction, the altitude, the temperature, and the atmospheric pressure. The computation unit 92 of the flight controller 80 may calculate the required power value based on the measured values of the wind speed, the wind direction, the altitude, the temperature, and the atmospheric pressure. The computation unit 92 of the flight controller 80 may calculate the power fluctuation value based on the measured values of the wind speed, the wind direction, the altitude, the temperature, and the atmospheric pressure.

When the steady wind speed increases, the airframe attitude change amount and the required power value become larger than those in the windless state. Further, when the fluctuation amount of the wind speed increases, the airframe attitude change amount due to the fluctuating wind increases. For this reason, the power required for attitude recovery increases. That is, the required power value increases. Further, in general, there is a correlation between steady wind and fluctuating wind. When the steady wind speed decreases, the wind speed fluctuation amount decreases, and when the steady wind speed increases, the wind speed fluctuation amount increases. That is, when the steady wind speed decreases, the required power value decreases and the fluctuating wind speed decreases, so that the power fluctuation value also decreases. On the other hand, when the steady wind speed increases, the required power value increases and the fluctuating wind speed increases, so that the power fluctuation value also increases. In this way, the required power value and the power fluctuation value change according to the wind speed. The computation unit 92 calculates the required power value and the power fluctuation value in accordance with the wind speed, whereby it is possible to cope with the power fluctuation when the fluctuating wind occurs.

Further, when the altitude is high, the fluctuating wind becomes strong. For this reason, the storage unit 94 may store in advance the required power value and the power fluctuation value corresponding to the altitude. Further, the storage unit 94 may store in advance the required power value corresponding to an air density determined based on at least one of the altitude, the temperature, or the atmospheric pressure. The storage unit 94 may store in advance the power fluctuation value corresponding to the air density determined based on at least one of the altitude, the temperature, or the atmospheric pressure.

[5. Invention Obtained from Embodiment]

The invention that can be grasped from the above embodiment will be described below.

According to an aspect of the present invention, provided is a hybrid aircraft 10 that flies using a plurality of rotors (takeoff and landing rotors 20 and cruise rotors 22), the hybrid aircraft 10 comprising: a generator (MG 76); a battery 78 charged with power generated by the generator; a plurality of electric motors 68 configured to rotate the respective rotors by the power generated by the generator and power supplied from the battery 78; and a controller 64 configured to set a target remaining capacity (target SOC) of the battery 78 according to a flight state of the hybrid aircraft, and control charging and discharging of the battery 78 in a manner that a remaining capacity (SOC) of the battery 78 approaches the target remaining capacity.

In the above configuration, the target SOC is set in accordance with the flight state. According to the above configuration, in the case of a flight state in which the excess or shortage of the required power value with respect to the generated power is large, it is possible to prevent the battery 78 from being overcharged by setting the target SOC to be low. Further, according to the above configuration, the generated power can be charged without waste. Further, according to the above-described configuration, in the case of a flight state in which the excess or shortage of the required power value with respect to the generated power is small, it is possible to prevent insufficient charging of the battery 78 by setting the target SOC to be high.

In the aspect of the present invention, the controller 64 may estimate a power fluctuation value that is a fluctuation value of power used by the plurality of electric motors 68, according to the flight state of the hybrid aircraft, and determine the target remaining capacity based on the power fluctuation value.

In the aspect of the present invention, the controller 64 may determines a flight mode as the flight state, and the flight mode may include a vertical takeoff and landing mode (M1, M5) in which the hybrid aircraft is moved in a vertical direction by generating lift by some of the rotors, and a horizontal flight mode (M3) in which the hybrid aircraft is moved in a horizontal direction by generating thrust by some of the rotors.

According to the above configuration, the target SOC is set in accordance with the flight mode related to the power fluctuation value. Therefore, the battery 78 can be prevented from being overcharged. In addition, insufficient charging of the battery 78 can be prevented.

In the aspect of the present invention, the hybrid aircraft may further comprise a storage unit 98 configured to store a table (SOC conversion table TB) in which the flight state and the power fluctuation value are associated with each other, and the controller 64 may estimate the power fluctuation value by using the table.

In the aspect of the present invention, the controller 64 may operate the generator to charge the battery 78 before the hybrid aircraft takes off, so as to compensate for an amount of decrease in the remaining capacity due to the battery 78 being used during a period from landing to takeoff of the hybrid aircraft.

According to the above configuration, the SOC of battery 78 becomes relatively high at the time of takeoff. Therefore, the SOC can be quickly brought close to the target SOC after takeoff.

In the aspect of the present invention, the hybrid aircraft may further comprise an internal combustion engine (GT 72) configured to supply motive power to the generator, the generator may be a motor generator 76 configured to operate the internal combustion engine with the power supplied from the battery 78 when the internal combustion engine is started and generate power with the motive power generated by the internal combustion engine after the internal combustion engine is started, and the controller 64 may operate the generator to charge the battery 78 during a period from start of the internal combustion engine to the takeoff of the hybrid aircraft, so as to compensate for an amount of decrease in the remaining capacity due to the start of the internal combustion engine.

According to the above configuration, it is possible to compensate for a decrease in the SOC due to the start of the GT 72 before the takeoff.

In the aspect of the present invention, the hybrid aircraft may further comprise an internal combustion engine (GT 72) configured to supply motive power to the generator, the generator may be a motor generator 76 configured to operate the internal combustion engine with the power supplied from the battery 78 when the internal combustion engine is started and generate power with the motive power generated by the internal combustion engine after the internal combustion engine is started, and the controller 64 may operate the generator to charge the battery 78 in advance during a period from the landing of the hybrid aircraft to stopping of the internal combustion engine, so as to compensate in advance for an amount of decrease in the remaining capacity due to start of the internal combustion engine.

According to the above configuration, it is possible to compensate for a decrease in the SOC due to the start of the GT 72 before the takeoff.

In the aspect of the present invention, the controller 64 may set the target remaining capacity to be low when the hybrid aircraft moves in a vertical direction, and set the target remaining capacity to be high when the hybrid aircraft moves in a horizontal direction.

The hybrid aircraft according to the present invention is not limited to the above-described embodiment, and various configurations can be adopted therein without departing from the gist of the present invention.

What is claimed is:

1. A hybrid aircraft that flies using a plurality of rotors, the hybrid aircraft comprising:
   a generator;
   a battery charged with power generated by the generator;
   a plurality of electric motors configured to rotate the respective rotors by the power generated by the generator and power supplied from the battery; and
   a controller configured to estimate, according to a flight state of the hybrid aircraft, a power fluctuation value that is a fluctuation value of power used by the plurality of electric motors, set a target remaining capacity of the battery based on the fluctuation value of power, and control charging and discharging of the battery in a manner that a remaining capacity of the battery approaches the target remaining capacity.

2. The hybrid aircraft according to claim 1, further comprising a storage unit configured to store a table in which the flight state and the power fluctuation value are associated with each other, wherein
   the controller estimates the power fluctuation value by using the table.

3. The hybrid aircraft according to claim 1, wherein
   the controller operates the generator to charge the battery before the hybrid aircraft takes off, so as to compensate for an amount of decrease in the remaining capacity due to the battery being used during a period from landing to takeoff of the hybrid aircraft.

4. The hybrid aircraft according to claim 3, further comprising an internal combustion engine configured to supply motive power to the generator, wherein
   the generator is a motor generator configured to operate the internal combustion engine with the power supplied from the battery when the internal combustion engine is started and generate power with the motive power generated by the internal combustion engine after the internal combustion engine is started, and
   the controller operates the generator to charge the battery during a period from start of the internal combustion engine to the takeoff of the hybrid aircraft, so as to compensate for an amount of decrease in the remaining capacity due to the start of the internal combustion engine.

5. The hybrid aircraft according to claim 3, further comprising an internal combustion engine configured to supply motive power to the generator, wherein
   the generator is a motor generator configured to operate the internal combustion engine with the power supplied from the battery when the internal combustion engine is started and generate power with the motive power generated by the internal combustion engine after the internal combustion engine is started, and
   the controller operates the generator to charge the battery in advance during a period from the landing of the hybrid aircraft to stopping of the internal combustion engine, so as to compensate in advance for an amount of decrease in the remaining capacity due to start of the internal combustion engine.

6. A hybrid aircraft that flies using a plurality of rotors, the hybrid aircraft comprising:
   a generator;
   a battery charged with power generated by the generator;
   a plurality of electric motors configured to rotate the respective rotors by the power generated by the generator and power supplied from the battery; and
   a controller configured to set a target remaining capacity of the battery according to a flight state of the hybrid aircraft, and control charging and discharging of the battery in a manner that a remaining capacity of the battery approaches the target remaining capacity, wherein the controller sets the target remaining capacity to be low when the hybrid aircraft moves in a vertical direction, and sets the target remaining capacity to be high when the hybrid aircraft moves in a horizontal direction.

7. The hybrid aircraft according to claim 6, wherein
the controller determines a flight mode as the flight state, and
the flight mode includes a vertical takeoff and landing mode in which the hybrid aircraft is moved in a vertical direction by generating lift by some of the rotors, and a horizontal flight mode in which the hybrid aircraft is moved in a horizontal direction by generating thrust by some of the rotors.

8. The hybrid aircraft according to claim 6, further comprising a storage unit configured to store a table in which the flight state and the power fluctuation value are associated with each other, wherein
the controller estimates the power fluctuation value by using the table.

9. The hybrid aircraft according to claim 8, further comprising an internal combustion engine configured to supply motive power to the generator, wherein
the generator is a motor generator configured to operate the internal combustion engine with the power supplied from the battery when the internal combustion engine is started and generate power with the motive power generated by the internal combustion engine after the internal combustion engine is started, and
the controller operates the generator to charge the battery during a period from start of the internal combustion engine to the takeoff of the hybrid aircraft, so as to compensate for an amount of decrease in the remaining capacity due to the start of the internal combustion engine.

10. The hybrid aircraft according to claim 8, further comprising an internal combustion engine configured to supply motive power to the generator, wherein
the generator is a motor generator configured to operate the internal combustion engine with the power supplied from the battery when the internal combustion engine is started and generate power with the motive power generated by the internal combustion engine after the internal combustion engine is started, and
the controller operates the generator to charge the battery in advance during a period from the landing of the hybrid aircraft to stopping of the internal combustion engine, so as to compensate in advance for an amount of decrease in the remaining capacity due to start of the internal combustion engine.

11. The hybrid aircraft according to claim 6, wherein
the controller operates the generator to charge the battery before the hybrid aircraft takes off, so as to compensate for an amount of decrease in the remaining capacity due to the battery being used during a period from landing to takeoff of the hybrid aircraft.

* * * * *